(12) United States Patent
Ripley

(10) Patent No.: US 8,513,828 B1
(45) Date of Patent: Aug. 20, 2013

(54) WIND TURBINE FOR ELECTRIC CAR

(76) Inventor: Peter W. Ripley, Hoodsport, WA (US)

(\*) Notice: Subject to any disclaimer, the term of this patent is extended or adjusted under 35 U.S.C. 154(b) by 0 days.

(21) Appl. No.: 13/506,733

(22) Filed: May 14, 2012

(51) Int. Cl.
*H02P 9/04* (2006.01)

(52) U.S. Cl.
USPC .......................................... 290/50; 180/2.2

(58) Field of Classification Search
USPC ................... 290/50, 44, 55; 180/2.2
See application file for complete search history.

(56) References Cited

U.S. PATENT DOCUMENTS

| | | | | |
|---|---|---|---|---|
| 3,876,925 A | * | 4/1975 | Stoeckert | 322/1 |
| 4,039,849 A | * | 8/1977 | Mater et al. | 290/55 |
| 4,179,007 A | * | 12/1979 | Howe | 180/2.2 |
| 4,423,368 A | * | 12/1983 | Bussiere | 322/35 |
| 6,897,575 B1 | * | 5/2005 | Yu | 290/44 |
| 7,135,786 B1 | * | 11/2006 | Deets | 290/55 |
| 7,828,091 B2 | | 11/2010 | Wedderburn, Jr. et al. | |
| 7,886,669 B2 | | 2/2011 | Kumar | |
| 8,169,182 B1 | * | 5/2012 | Kimble | 320/101 |

\* cited by examiner

*Primary Examiner* — Vanessa Girardi
(74) *Attorney, Agent, or Firm* — Brian J. Coyne

(57) ABSTRACT

A system for harnessing wind energy to charge the electric storage battery of an all-electric motor vehicle, whether the vehicle is parked or in motion. While the vehicle is being driven, a roof-mounted, internal wind turbine harnesses wind energy and causes rotation of the shaft of an electric generator mounted to an interior surface of the roof. For charging the battery while the vehicle is parked, an external wind turbine is storable in the vehicle when not in use and attaches to the internal wind turbine. Cups of the kind used in cup anemometers are attached to radial arms that extend from an external shaft of the external wind turbine and catch ambient wind currents while the vehicle is parked, causing the external shaft and the generator shaft to rotate.

21 Claims, 15 Drawing Sheets

WIND TURBINE FOR ELECTRIC CAR

CROSS-REFERENCE TO RELATED PATENT APPLICATIONS

None.

STATEMENT REGARDING FEDERALLY APPROVED RESEARCH OR DEVELOPMENT

None.

BACKGROUND OF THE INVENTION

1. Field of the Invention

This invention relates generally to devices for charging an electric battery of a motorized vehicle, and more particularly to devices for harnessing wind energy to charge an electric battery of an electric car.

2. Background Art

As used here, the term "all-electric vehicle" refers to any motor vehicle that is powered exclusively by an electric drive train. Hybrid motor vehicles with a drive train powered by an internal combustion engine in combination with one or more electric motors are now common on our streets and highways, but public acceptance of all-electric vehicles has been relatively slow. The slow acceptance of all-electric vehicles is largely due to the limited driving range such vehicles are currently capable of on a single charge of their electric storage batteries. In addition, currently, there are relatively few places accessible to the public for recharging the batteries of an all-electric vehicle compared to the number of gasoline and diesel refueling stations; and, in any case, the time required to recharge the batteries is significantly longer than the time required to fill the fuel tank of a vehicle that runs on gasoline or diesel fuel. Driving an all-electric vehicle beyond its rated driving range and to a location that lacks suitable battery charging facilities would likely mean incurring the time and expense for tow truck assistance before the driver could be underway again. To avoid that fate, and to promote public acceptance of all-electric cars, it would be desirable to harness wind energy to help maintain some of the charge in the electric storage battery of an all-electric vehicle while the vehicle is being driven, as well as to charge the battery by harnessing wind energy while the vehicle is parked.

U.S. Pat. No. 7,886,669 B2 disclosed a method for harnessing wind energy to charge a system battery that powered electronic components of a stationary locomotive after engine shut down or while the locomotive was coasting under gravity with its engine shut down, such components comprising lights and on-board monitoring and display systems of the locomotive. An electric device, such as a motor that could be run in generator mode, was coupled to an airflow device that was rotatable by ambient air flow, and a controller was provided to enable the airflow device and generator only when some minimum rotational speed of the airflow device was detected. For instance, the airflow device was fan blades that, in a first mode of operation, could be driven by the electric device to provide cooling and, in a second mode of operation, harness ambient wind energy to drive the electric device to generate electricity, which electricity was conducted to the electric power load and/or to the electric storage battery of the locomotive.

U.S. Pat. No. 7,828,091 B2 disclosed an all electric vehicle that used an internal wind turbine generator mounted in the nose of the vehicle, compressed air and a high voltage battery to generate electricity to power the DC motors that drove the vehicle. When available wind energy was inadequate, compressed air stored in one or more air tanks drove an air motor coupled to an electric generator to generate electricity to recharge the electric battery and/or to power the DC motors.

SUMMARY OF THE INVENTION

The present invention provides a system for charging an electric storage battery of an all-electric motor vehicle. The system includes a first, internal wind turbine that mounts to the roof of the vehicle after a vertically-directed, through-hole has been created in a central portion of the roof. The term "internal" as applied to the first wind turbine is here intended to signify a wind turbine that, when mounted to the roof of an all-electric motor vehicle and ready for use, is substantially enclosed within a housing, described below, and covered by a lid. The internal wind turbine is intended to provide electric current charge to the vehicle's electric storage battery while the vehicle is in motion. The invention further includes a second, external wind turbine that also mounts to the roof exterior of an all-electric vehicle, but is intended to provide electric current charge to the vehicle's electric storage battery while the vehicle is parked. The term "external" here signifies that the second, external wind turbine, when mounted to an all-electric vehicle, is external not only to the vehicle itself, but also to the housing.

The internal wind turbine has a housing that includes a bottom panel that extends longitudinally from a front end to an opposite, rear end thereof, and extends laterally from a first side to an opposite, second side thereof. The bottom panel is dimensioned and contoured to overlie the vehicle roof that includes the through-hole. The bottom panel has a centrally-disposed, flat, upper surface and an opposite, lower surface. A vertically-directed, shaft opening extends from the flat upper surface of the bottom panel through the panel to its lower surface. The housing further includes an air inlet opening that overlies the front end of the bottom panel, an air outlet opening that overlies the rear end of the bottom panel, and an air flow corridor attached to the bottom panel that extends between, and joins, the air inlet and outlet openings. The air flow corridor comprises an entryway portion in communication with the air inlet opening, a discharge portion in communication with the air outlet opening, and a central portion that communicates with the entryway and discharge portions. The entryway portion is contoured to conduct air entering the inlet opening while the vehicle is in forward motion toward the second side of the bottom panel, the central portion is contoured to conduct air rotationally around the shaft opening, and the discharge portion is contoured to conduct air within the central portion to the air outlet opening.

The internal wind turbine further includes a turbine blade assembly disposed within the central portion of the air flow corridor. The turbine blade assembly includes a hub that extends axially along a turbine shaft axis from a first, lower end to a second, upper end thereof and is rotatable about said axis. A plurality of turbine blades are distributed about the periphery of the hub and extend radially away from the hub normal to the turbine shaft axis. Each turbine blade has a weighted, blade tip.

The internal wind turbine also includes electric generator means, comprising an electric generator; means for attaching the electric generator to an inside surface of the roof of the vehicle; and means for coupling the shaft of the electric generator to the hub of the turbine blade assembly. The first wind turbine further includes a lid that extends longitudinally from a front end to an opposite rear end thereof. The front end of the lid is pivotally attached to a front portion of the housing such that the lid is pivotable between a lowered, housing-covering position and a raised, open position. In its lowered position, the lid, in combination with the corridor, bottom panel and seal means, forms a closed compartment surrounding the turbine blade assembly, except for the air inlet and air outlet openings. The internal wind turbine further includes locking means attachable to a rear end of the lid and to a rear portion of the vehicle for alternately securing the lid in a lowered, closed position and releasing the lid to a raised position. The turbine blade assembly may be removed from the housing to replace damaged blades, clean the housing. To facilitate removal of the turbine blade assembly from the housing, the means for coupling the shaft of the electric generator to the hub of the turbine blade assembly preferably includes an adaptor with radially-directed splines that attaches to the shaft of the electric generator shaft by set screws, and a hub shaft that extends axially though the hub and has a lower, recess that is shaped and dimensioned to receive the adaptor splines in mating engagement. A removable pin inserts through aligned apertures in the hub and hub shaft to couple them for co-rotation. Accordingly, when so coupled by the adaptor and said pin, the generator shaft and the turbine blade assembly rotate as one about the turbine shaft axis. The blades are preferably attached to the hub by threaded fasteners, which facilitates replacement of damaged blades once the blade assembly has been lifted off the splined adaptor and removed from the vehicle.

The invention further includes an external wind turbine. The external wind turbine is intended for converting wind energy into electrical current to charge the battery of the vehicle while the vehicle is parked. To accommodate installation of the second wind turbine, the lid has an opening where the turbine shaft axis (A-A) passes through the lid when the lid is in a lowered position. Means to seal the housing against moisture and air leaks is optionally provided, which means includes a disk-shaped, hub grommet disposed above and covering an upper portion of the hub, which grommet has an upstanding neck that extends up through the opening in the lid; a washer mounted on the neck adjacent to an upper surface of said lid; and a cap seal that mounts on the neck over the washer. The external wind turbine includes an external shaft that extends from an upper end to an opposite, lower end along an external shaft axis, which shaft is rotatable about that axis. The external shaft is "external" in the sense that, when installed in operating mode on the parked vehicle, said shaft extends upward and externally from the housing and with only a lower end portion of the shaft extending into the housing. The external wind turbine further includes a plurality of radially-directed arms circumferentially spaced apart around the external shaft, wherein each arm has an inner end attached to the shaft and an opposite, outer end. For "catching" the movements of ambient wind, a cup is attached to an outer end of each arm. Each cup has a concave inner surface and a convex outer surface that meet at the opening of the cup. The opening of each cup is directed essentially along the tangent to the rotational path of the cups about the external shaft axis, and all cups are oriented in the same rotational sense about the external shaft axis. The number of arms and cups is optional, but three of each spaced at 120° intervals about the shaft rotary axis is the preferred number. Thus, the external wind turbine resembles a cup anemometer in appearance and mechanical function.

The invention further includes means to couple the lower end of the external shaft to the hub for co-rotation therewith while maintaining the external shaft in coaxial alignment with the turbine shaft axis. In a first embodiment, the means to couple the external shaft to the hub is accomplished as follows. An upper end portion of the hub shaft has a cylindrical, upper recess that extends downward along the turbine shaft axis from the upper end of the hub shaft to a bottom end of the recess. The upper recess is dimensioned to receive in surrounding engagement a lower end portion of the external shaft, thereby defining an upper recess wall. The upper recess wall has a pair of grooved pathways disposed at diametrically opposite locations on the recess wall. Each pathway comprises, sequentially, a first leg that extends from the upper end of the hub shaft toward the bottom end of the recess, a second leg that extends through a circumferential arc normal to the turbine shaft axis, and a third leg that extends reversely part way back toward the upper end of the hub shaft 70, thereby forming a blind end of the pathway. A pair of oppositely-disposed, oppositely-directed ears are attached to, and extend away from the lower end portion of the external shaft, which ears are shaped and dimensioned to be received in sliding engagement within the grooved pathways. A disk-shaped buffer plate is disposed within the upper recess intermediate the bottom end and the grooved pathways thereof. The buffer plate is dimensioned for sliding engagement with an inner surface of the upper recess wall and along the turbine shaft axis, and a spring disposed intermediate the bottom wall of the upper recess and the buffer plate urges the buffer plate away from the bottom end of the recess and toward the grooved pathways.

To install the external wind turbine on a parked, all-electric, vehicle, the internal wind turbine remains in place mounted on the roof exterior and with the lid lowered and locked. A lower end of the external shaft is inserted down through the opening of the lid and aligned coaxial with the turbine shaft axis and with its ears aligned with the first legs of the grooves. The external shaft is pressed downward against the buffer plate as the ears slide down through the first legs of the grooves, thereby compressing the spring. The external shaft is then partially rotated about the turbine shaft axis to move the ears through the second legs of the grooves, and then partially retracted so that the ears slide up the third legs and lodge within the blind ends of the grooves. To dismount the external turbine from the vehicle, that process is reversed, and the external turbine can then be stored within the vehicle, available for future use.

In a second, alternative embodiment of the invention, the coupling of the external shaft to the hub is accomplished as follows. An upper end portion of the hub shaft has an upper recess that extends downward along the turbine shaft axis from the upper end of the hub shaft to a bottom end of the recess. The upper recess is shaped and dimensioned to receive in surrounding engagement a lower end portion of the external shaft, thereby defining an upper recess wall. One or more ball-and-spring assemblies are attached to an inner surface of the recess within an alcove thereof. Each ball-and-spring assembly comprises a spring having a first end attached to the upper recess wall and a second, opposite end to which is attached a ball, such that the ball is movable between an extended, recess-occluding position and a retracted, non-occluding position within an alcove. The lower end portion of the external shaft has at least one beveled indent that is shaped and dimensioned to receive in sliding engagement a ball, thereby causing, as the external shaft is moved into the upper recess, the following sequence of events: sliding engagement with the balls, progressive compression of the springs, retraction of the balls into its alcoves, and then capture of the balls within the beveled indent of the external shaft. Accordingly, downward movement of a lower end of the external shaft along the turbine shaft axis will seat the external shaft for co-rotation with the hub, whereas a forceful yank upwards on the external shaft will de-couple them and permit removal of the external wind turbine from the vehicle.

DETAILED DESCRIPTION

Figure 1:
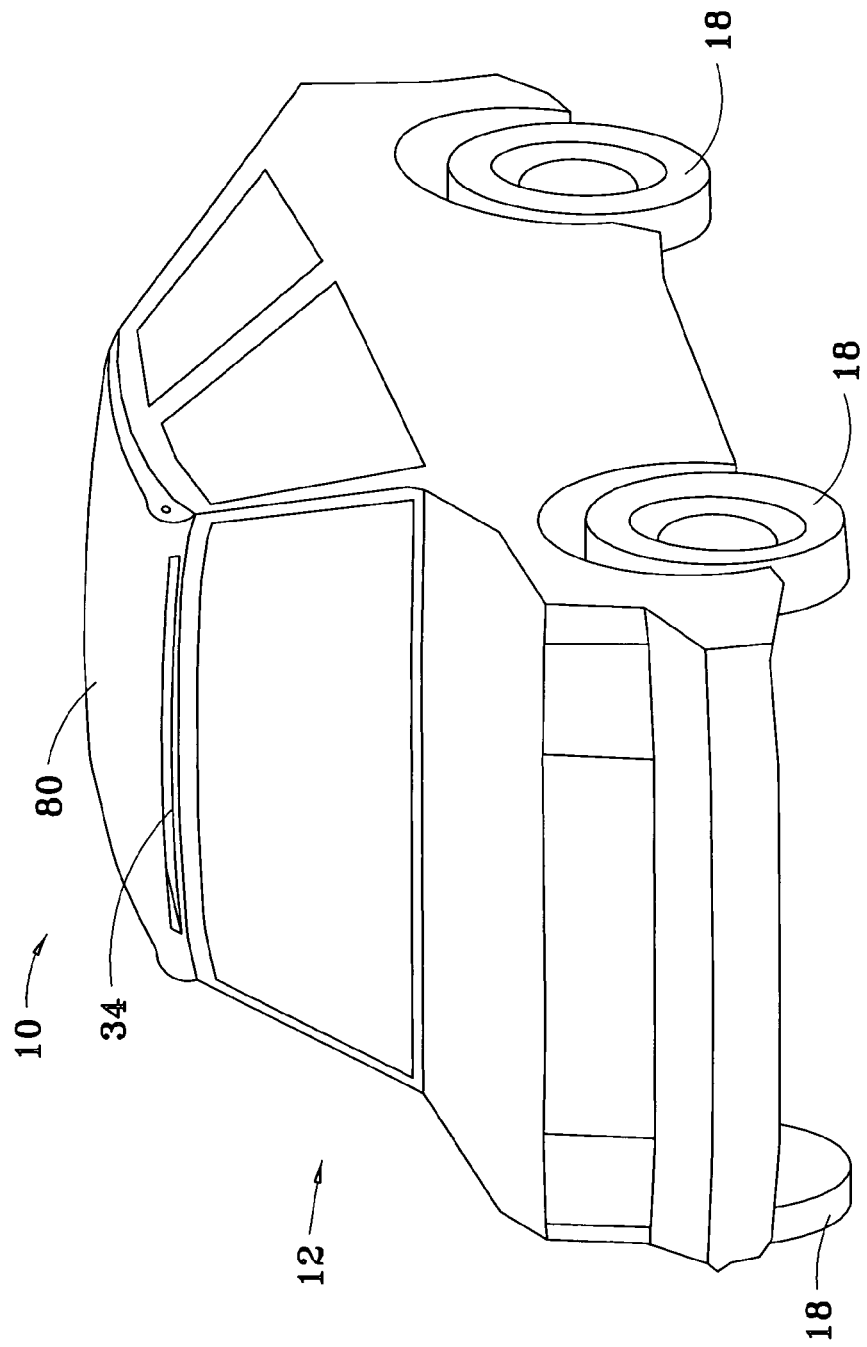
FIG. 1 is a front, perspective view of a 2-door, all-electric motor vehicle equipped with the present invention and configured for charging the electric storage battery of the vehicle while the vehicle is in motion.
Figure 2:
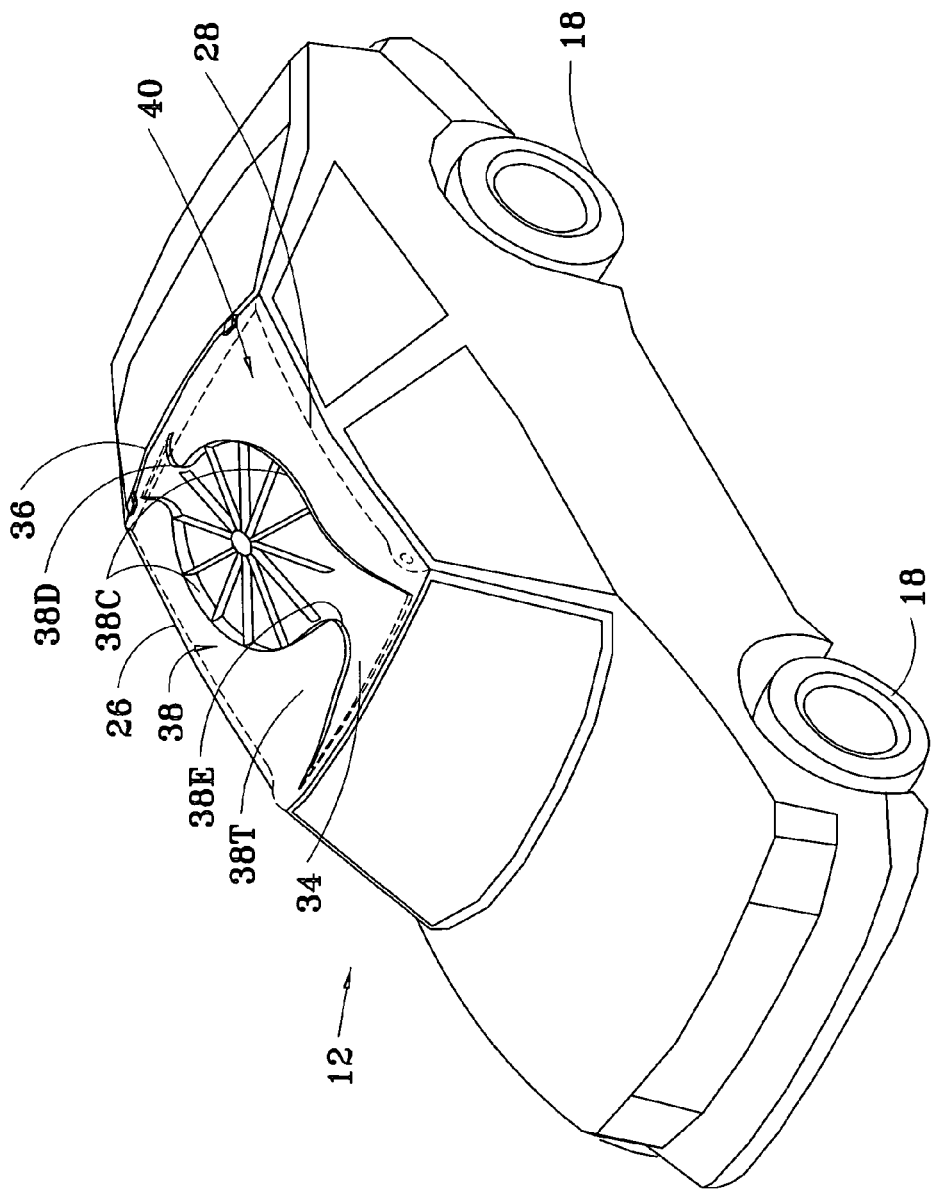
FIG. 2 a top, perspective view thereof, with the lid removed.

Referring now to FIGS. 1-4, the internal wind turbine 10 of the present invention is shown mounted to the roof 14 of an all-electric, motor vehicle 12. The motor vehicle depicted is a 2-door sedan, but the invention can be installed on the roof of other types of all-electric, motor vehicles, such as all-electric 4-door sedans, roadsters, vans, pickup trucks, etc. Although not depicted in the drawings, it will be understood that the vehicle 12 is equipped with one or more electric storage batteries that provide electric power to one or more drive motors that are in driving engagement with the wheels 18 of the vehicle when the vehicle is being driven. Prior to installation of the internal wind turbine 10 on the roof 14 of the vehicle 12, a vertical through-hole 16 is drilled through the roof 14 as may be seen in FIG. 6. The internal wind turbine 10 has a housing 20, comprising a bottom panel 22 that extends longitudinally from a front end 22F to an opposite, rear end 22R thereof, and extends laterally from a first side 26 to an opposite, second side 28 thereof. For the sake of appearance and to minimize wind resistance and noise when the vehicle is being driven, the bottom panel 22 is preferably dimensioned and contoured to closely overlie an exterior surface of at least the portion of the vehicle roof that includes the through-hole 16. This means, for instance, that any gap between the bottom panel 22 and the exterior surface of the roof 14 preferably should be kept to less than 5 mm. Centrally disposed on the bottom panel 22 is an area of flat, upper surface 30. A vertically-directed, shaft opening 32 in that flat upper surface 30 extends through the bottom panel 22 to an opposite, lower surface thereof. An air inlet opening 34 overlies the front end 22F of the bottom panel 22 and permits air to enter the internal wind turbine 10 while the vehicle 12 is in forward motion. An air outlet opening 36 overlies the rear end 22R of the bottom panel 22 and permits air to exit the internal wind turbine 10 when the vehicle 12 is in forward motion. An air flow corridor 38 attached to the bottom panel extends between, and joins, the air inlet 34 and outlet 36 openings. The air flow 38 corridor comprises an entryway portion 38E in communication with said air inlet opening, a discharge portion 38D in communication with said air outlet opening 36, and a central portion 38C that communicates with said entryway 38E and discharge 38D portions. The entryway portion 38E is contoured to conduct air entering the inlet opening 34 toward the second side 28 of the bottom panel 22. The central portion 38C is contoured to conduct air from the entryway portion 38C rotationally around the shaft opening 32 and is defined by first and second, upstanding, semicylindrical, interior walls that are laterally and symmetrically spaced apart on opposite sides of the turbine shaft axis A-A. Although the term "semicylindrical" generally refers to a bisected half of a cylinder, in the present context it will be understood that the term "semicylindrical" is being used loosely to include an arcuate sector that can be somewhat less than a full, 180° semicircular arc—for example, an arc anywhere in the range 120° to 180°. The discharge portion 38D is contoured to conduct air from the central portion 38C to the air outlet opening 36. Accordingly, with the vehicle 12 in forward motion, as air rushes through the air flow corridor 38 a rotational moment is imparted to the air about the turbine shaft axis A-A in a counterclockwise direction as the corridor 38 is depicted in FIG. 2. The air flow corridor 38 further includes a tongue 38T that extends laterally from the first pivot mount 82 part way across, and above, said front end 22F of the bottom panel 22, and, as such, helps define the air inlet opening 34. While the vehicle 12 is in forward motion, the tongue 38T deflects the oncoming flow of air away from the first side 26 and toward the second side 28 of the bottom panel 22, the better to impart a rotational moment to the air about the turbine shaft axis A-A.

Referring now to FIGS. 6-12, the internal wind turbine 10 further includes a turbine blade assembly, denoted generally by the numeral 40, disposed within the central portion 38C of the air flow corridor 38. The turbine blade assembly 40 includes a hub 42 that extends axially along the turbine shaft axis A-A from a first, lower end 42L to a second, upper end 42U thereof and is rotatable about said axis. A plurality of turbine blades 44 is distributed about the periphery of the hub and extend radially away from the hub 42 normal to the turbine shaft axis A-A. For each blade 44, the hub 42 has a collar 41 within an opening in the hub, which collar may be welded or press fit therein. A first end of each blade 44 is attached by threaded fasteners 45 (e.g., hex-head bolts) to a collar 41 and has an opposite, tip end 46. Preferably, each blade tip 46 is weighted as, for example, by two beads of metal 47 welded to an upstream, concave side of the blade tip; see FIG. 10. A damaged blade 44 may be removed for replacement by loosening its threaded fasteners 45 and pulling the blade out of its collar 41.

Figure 6:
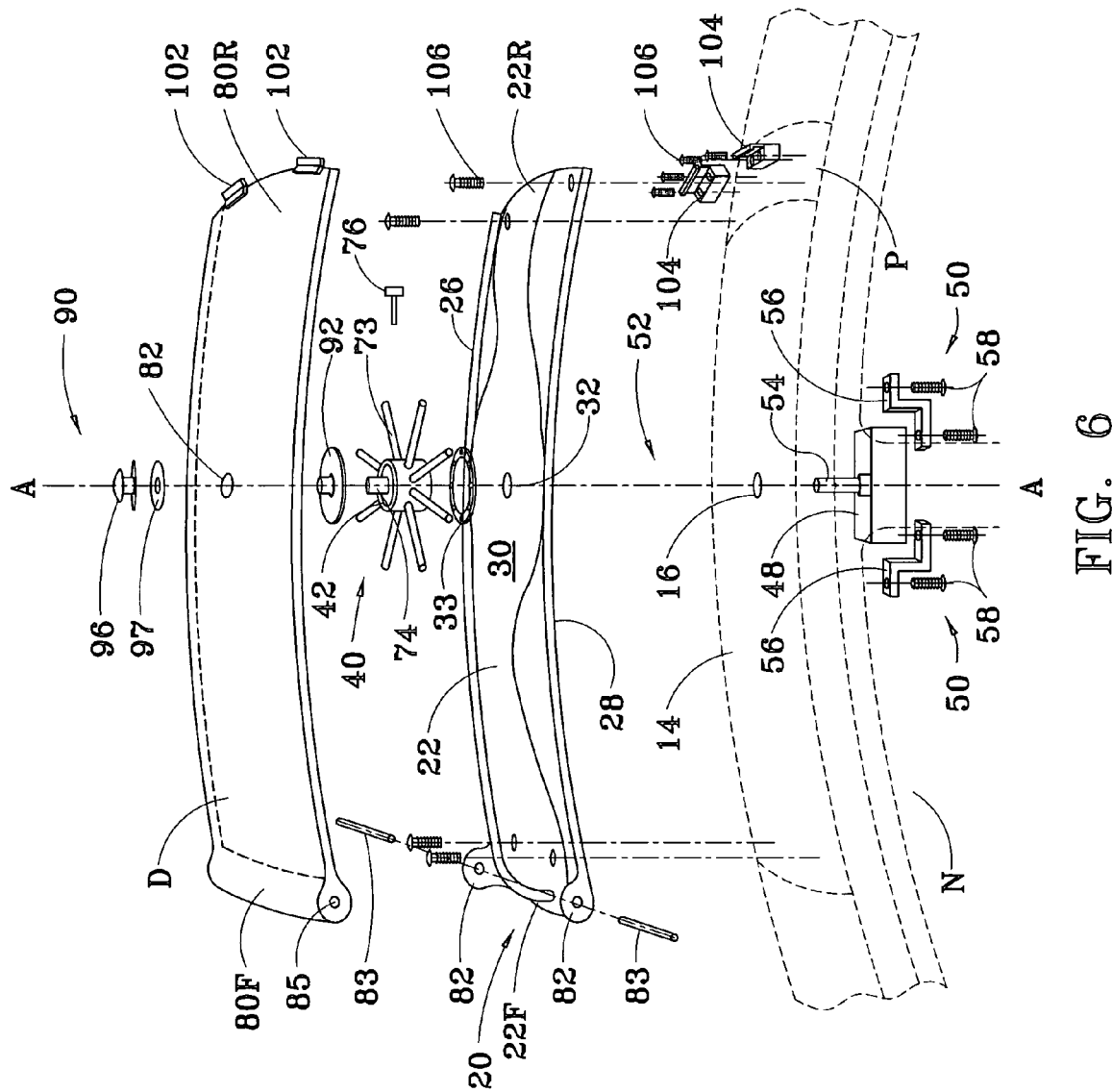
FIG. 6 is an enlarged, exploded, perspective, side view of the internal wind turbine of the invention showing the vehicle to which it attaches depicted in fragmentary, phantom outline.

Referring now to FIG. 6, it is seen that the internal wind turbine 10 further comprises electric generator means, which means include an electric generator 48, means 50 for attaching the electric generator to an inside surface of the roof 14 of the vehicle 12, and means 52 for coupling the shaft 54 of the electric generator to the hub 42. The means 50 for attaching the electric generator 48 to the inside surface of the roof 14 can be any of various means known to persons of ordinary skill in the art of installation of motor vehicle electrical components, such as the pair of brackets 56 and the threaded fasteners 58 depicted in FIG. 6. To minimize reduction of headroom space inside the passenger compartment of the vehicle 12, the electric generator 48 should be compact and have a narrow side profile.

Figure 3:
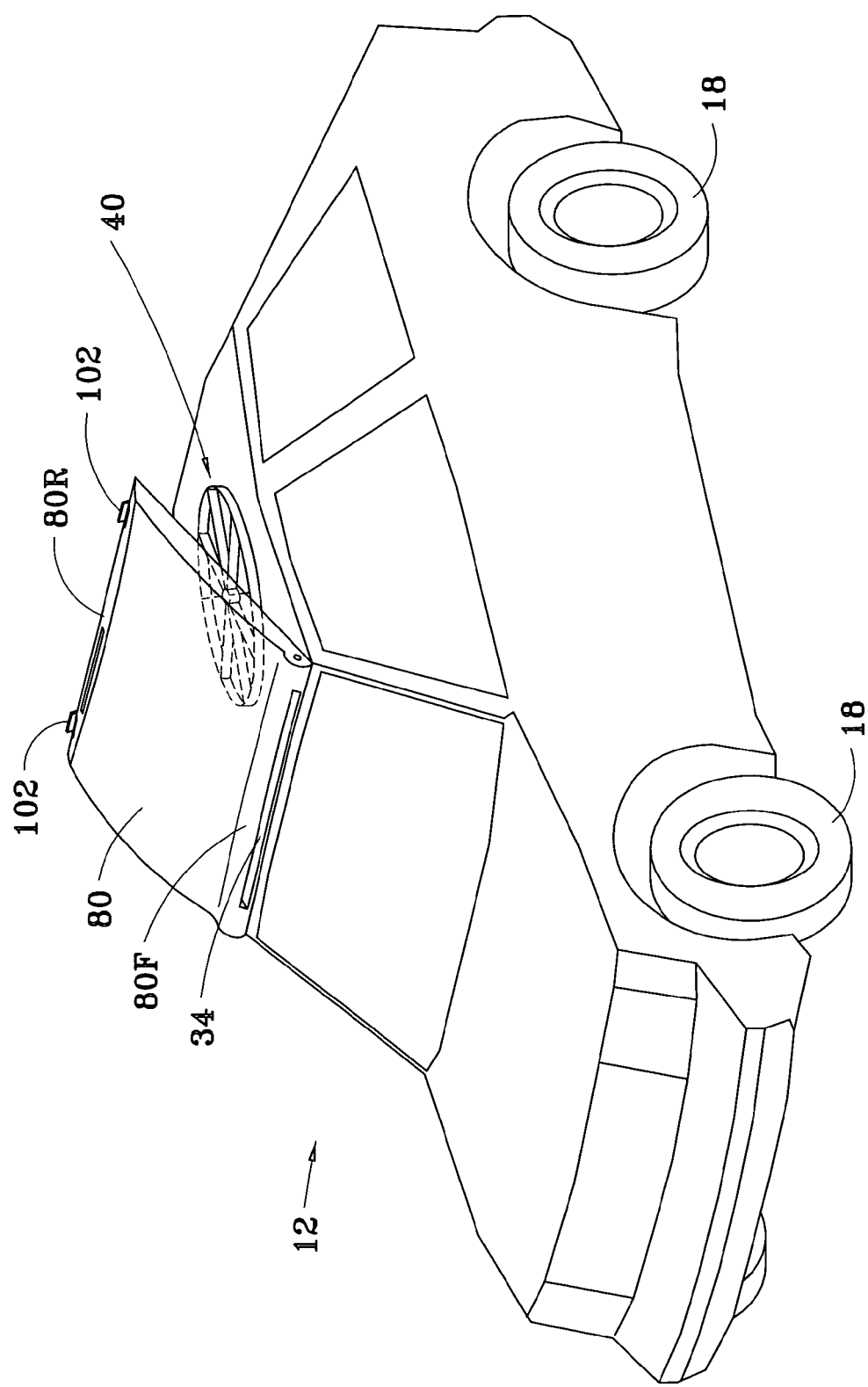
FIG. 3 is a front, perspective view thereof showing the hinged lid angularly raised and showing the blades of the turbine blade assembly in phantom outline.
Figure 4:
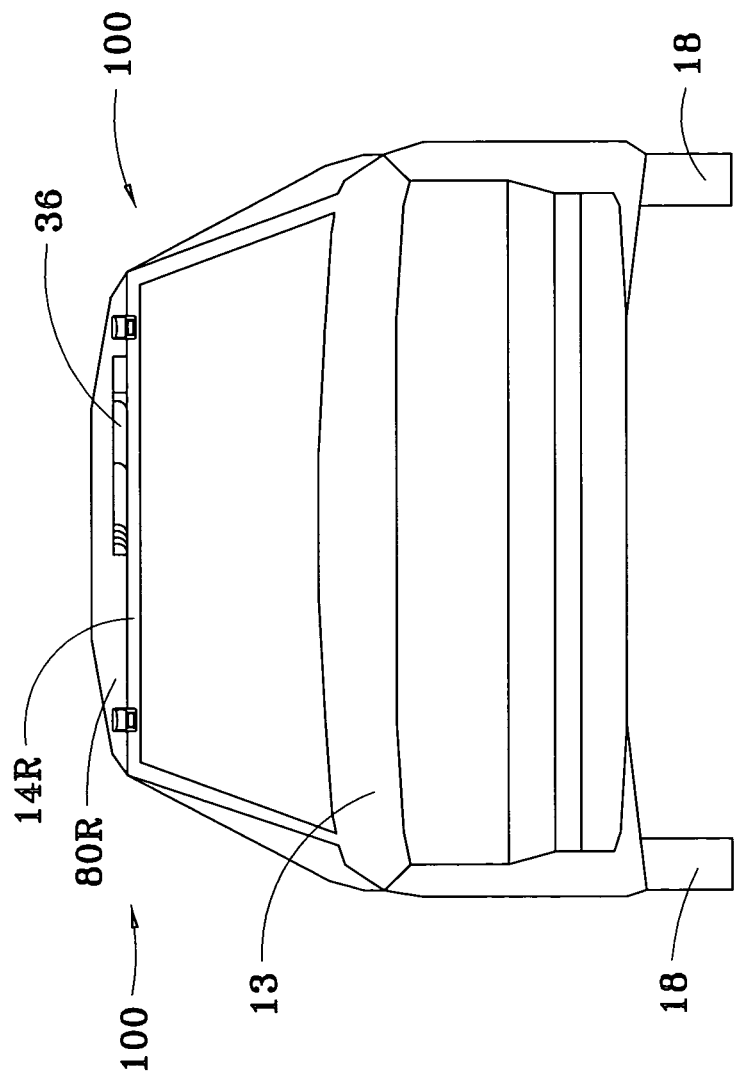
FIG. 4 is a rear, elevational view thereof with the lid in closed position.

The internal wind turbine 10 further includes a lid 80 that extends longitudinally from a front end 80F to an opposite rear end 80R thereof and is shaped and dimensioned to be able to cover the entirety of the housing 20. The housing 20 has a pair of laterally spaced-apart, upstanding, apertured, pivot mounts 81 attached to the bottom panel 22, at or near a front end 22F of said panel. A front end 80F of the lid 80 has a laterally-directed, pin-receiving aperture 85 and is pivotally attached to the pivot mounts 82 by a pair of pivot pins 83 that insert into said apertures, such that the lid is pivotable between a lowered, housing-covering position (FIG. 1) and a raised, open position (FIG. 3). To facilitate repair and maintenance of the internal wind turbine 10, the pivot pins 83 can be withdrawn from the pivot mounts 82, which permits removing the lid 80 entirely from the housing 20. The lid 80 has an opening 82 aligned with the turbine shaft axis A-A when the lid is in the lowered position. In the lowered position, the lid 80, in combination with the corridor 38, bottom panel 22 and seal means 90, forms a closed compartment surrounding said turbine blade assembly 40, except for the air inlet 34 and air outlet 36 openings. Referring to FIG. 6, the seal means 90 for sealing the housing 20 against moisture and air leaks includes hub grommet 92 comprising a ring washer joined to an upstanding, hollow, cylindrical, neck or tube that extends up through the opening 82 in the lid 80. The neck portion of the hub grommet 92 extends above the upper surface of the lid 80 by, for example, 3 to 10 mm, and a removable cap 96 having a downward-directed hollow, cylindrical neck or tube mounts on that upper, extended neck portion of the hub grommet 92 in surrounding engagement. Preferably, the seal means 90 further includes an annular washer 97 that also mounts on the neck portion of the hub grommet 92 intermediate the upper surface of the lid 80 and the cap 96. The seal means 90 will ordinarily remain in place attached to the lid 80 while the lid is being pivoted up and down between its lowered and raised positions; but, when the vehicle 12 is parked with the lid in lowered position, and it is desired to use wind energy to charge the electric storage battery, the cap 96 is removed and the external shaft 202 of an external wind turbine 200 is inserted through the lid opening 82 and hub grommet 92. Accordingly, the lid opening 82 and the hub grommet 92 are dimensioned to receive the external shaft 202. The hub grommet 92, cap 96 and annular washer 97 preferably comprise butyl rubber.

The internal wind turbine 10 also has lid locking means, denoted generally by the numeral 100, comprising a laterally spaced apart pair of upper half clasps 102 that attach by hinges to the rear end 80R of the lid 80 and a mating, laterally spaced apart pair of half clasps 104 that attach to a rear portion of the vehicle 12 by threaded fasteners 106—for example, to a rear portion 14R of the roof 14 thereof. As will be apparent to persons of ordinary skill, any of a variety of kinds of mating pairs of half clasps can be used for this purpose—for example, the mating pairs of half clasps on steamer trunks as well the mating pairs of half clasps on mechanics' tool boxes.

Figure 7:
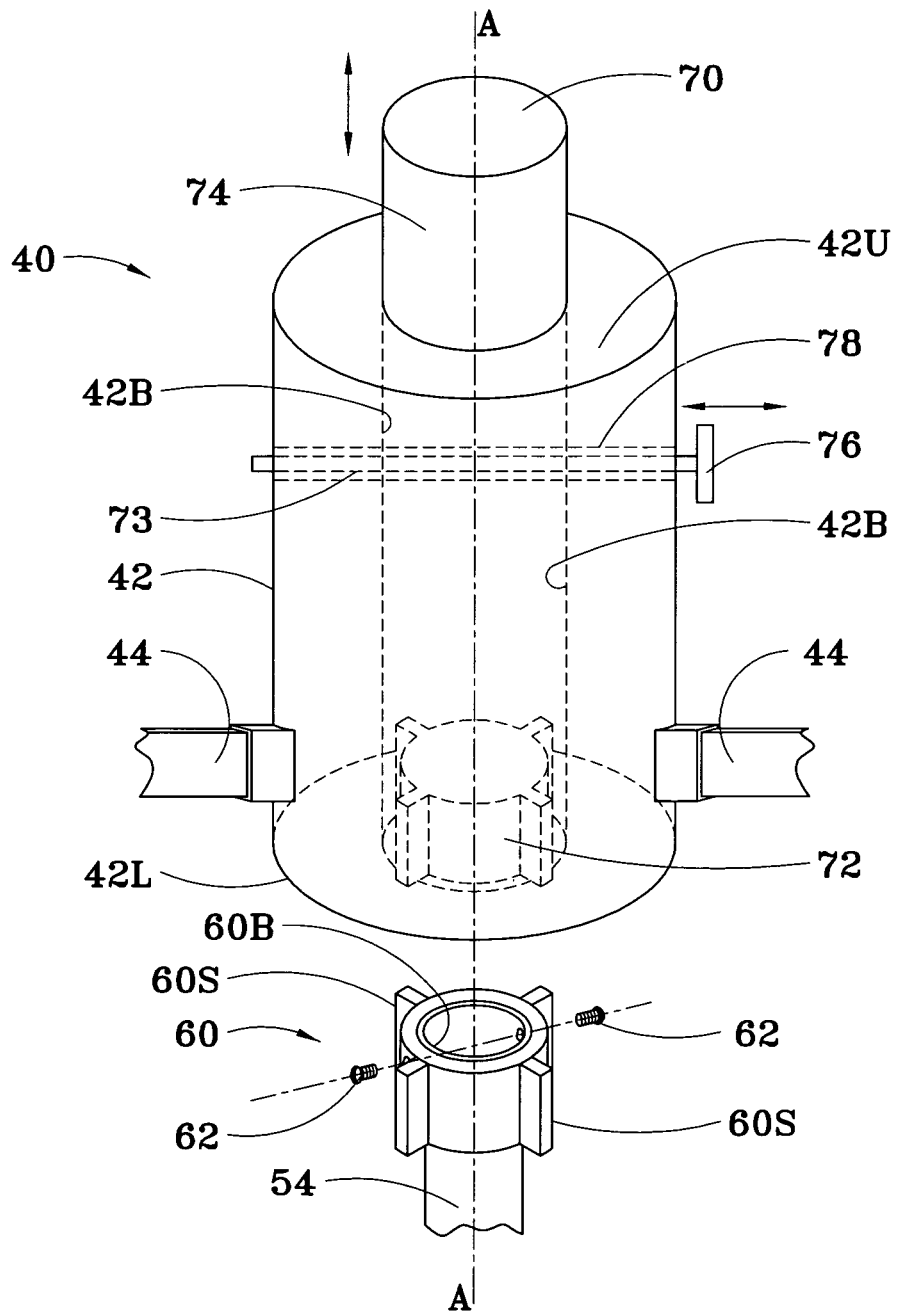
FIG. 7 is an exploded, perspective, side view of a turbine hub assembly and of an upper end portion of an electric generator shaft to which is attached a splined adaptor that is insertable into a mating, splined recess of a hub shaft portion of the hub assembly.
Figure 8:
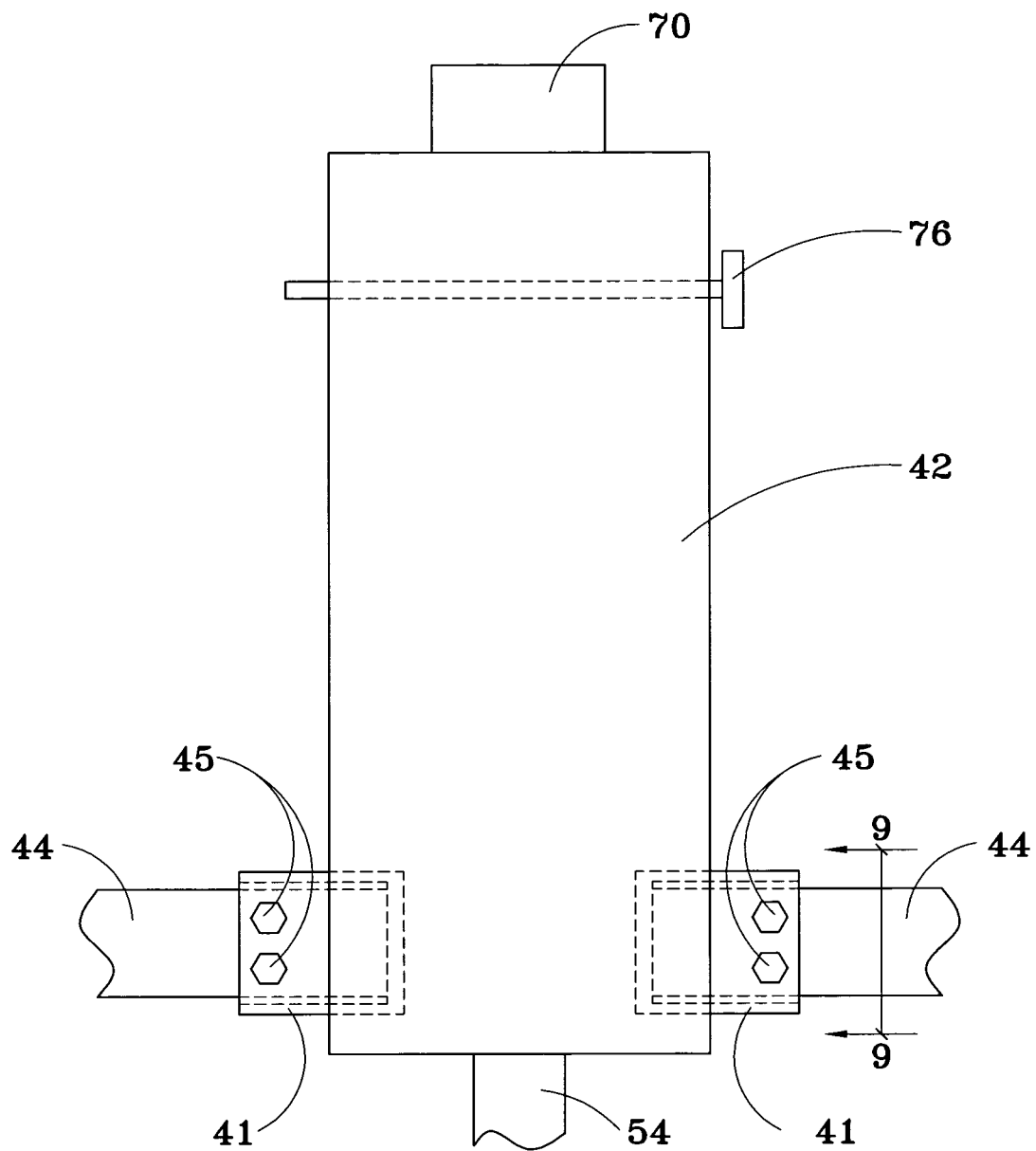
FIG. 8 is an enlarged, side elevational view of the hub assembly, showing a hub shaft that extends along the axis A-A of the hub and protrudes above the hub and turbine blades fitted into radially-directed collars that are spaced apart around the periphery of the hub and attached by hex-head bolts.
Figure 9:
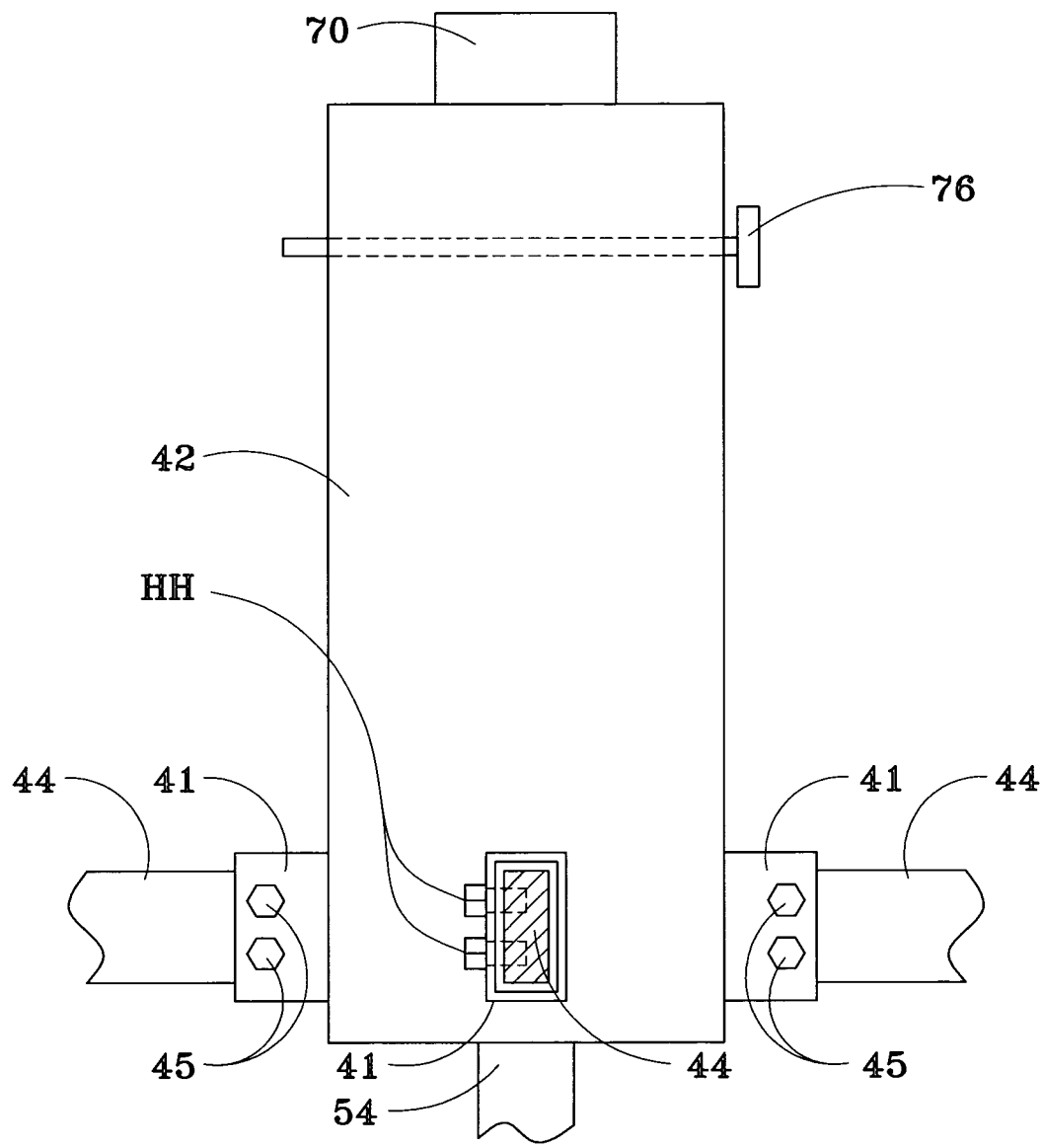
FIG. 9 is a vertical cross-section view taken along line 9-9 of FIG. 8.
Figure 10:
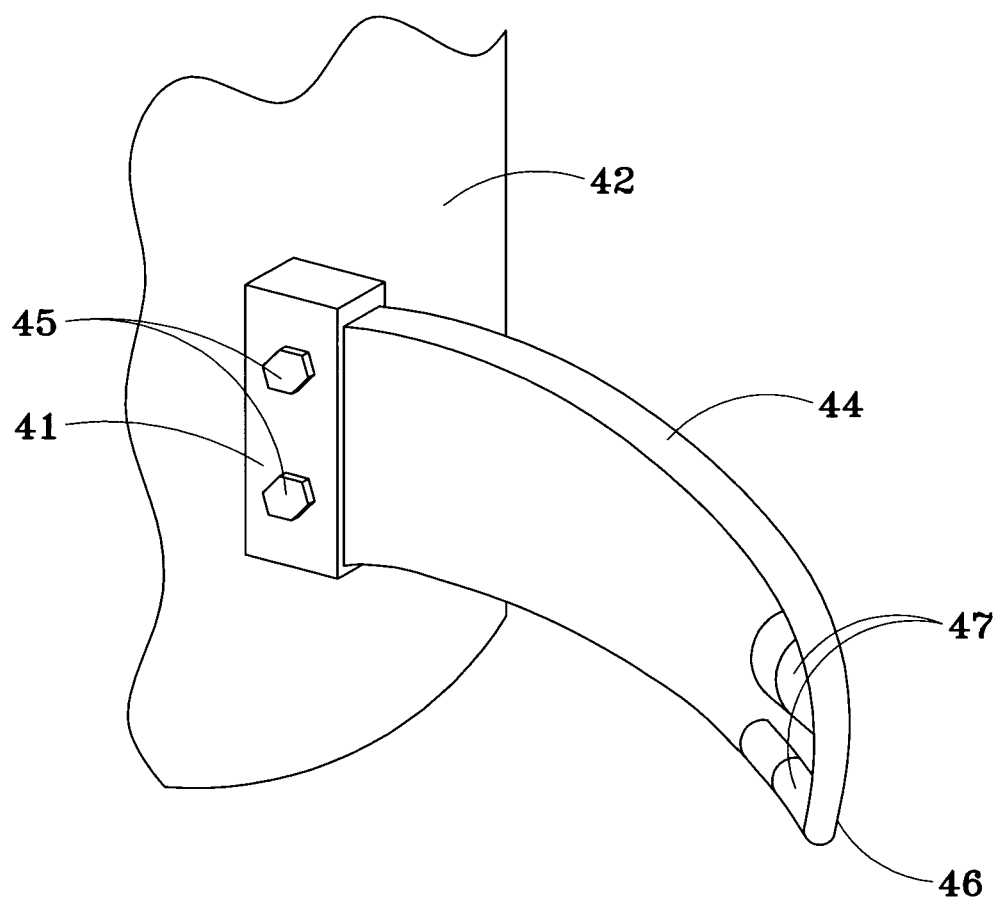
FIG. 10 is a perspective, side view of a single turbine blade, showing its insertion through a collar, a fragmentary view of a lower portion of the hub, and a pair of weights attached to an upstream, concave side of a blade at the tip end thereof.

The internal wind turbine 10 has means 52 for coupling the shaft 54 of the electric generator 48 to the hub 42 so that they will rotate as one about the turbine shaft axis A-A. The means 52 includes an adaptor 60 that is attachable to the generator shaft 54 by, for example, set screws 62 that screw into threaded apertures in the adaptor; FIG. 7. The adaptor 60 includes a plurality of radially-directed, splines or vanes 60S circumferentially spaced apart about the adaptor and has a throughbore 60B having a diameter dimensioned to receive in surrounding engagement the generator shaft 54. Although the adaptor 60 depicted in FIG. 7 has four splines 60S, the number of splines may vary from one to 12. The hub 42 has an axial throughbore 42B that extends from the lower end 42L to the upper end 42U thereof. A hub shaft 70 having an external diameter somewhat less than the internal diameter of the throughbore 42B is slidably insertable into and out of the throughbore. Optionally, when fully inserted into the throughbore 42B of the hub 42, the hub shaft 70 may have an upper end portion 74 that protrudes above the upper end 42U of the hub 42, as depicted in FIG. 6, but such protrusion must not be so far as to interfere with lowering the lid 80 to a fully closed and locked position.

A lower end portion of the hub shaft 70 includes a lower recess 72 (phantom outline in FIG. 7) that is shaped and dimensioned to receive in mating engagement the splines 60S of the adaptor 60. When the splines 60S of the adaptor 60 are inserted within the lower recess 72 of the hub shaft 70, the generator shaft 54 is coupled for co-rotation with the hub shaft 70. A pin 76 is insertable through a horizontal aperture 78 in the hub shaft 70 as well as through a co-aligned aperture 73 in hub 42 near the upper end 42U of the hub 42. So long as the pin 76 is so inserted through both the hub 42 and the hub shaft 70, the generator shaft 54, adaptor 60, hub shaft 70 and hub 42 are mechanically coupled and will rotate as one about the turbine shaft axis A-A. Moreover, in the event the vehicle 12 is jostled traversing uneven ground, the pin 76 prevents relative vertical movement between the hub 42 and the hub shaft 70. By raising or removing the lid 80 and withdrawing the pin 76 from the hub 42 and hub shaft 70, the hub 42 and attached blades 44 can be lifted up and away from the adaptor 60 and hub shaft 70, which permits replacing a damaged blade 44 and/or cleaning the housing 20 of accumulated dirt and debris. To minimize the friction of rotation of the turbine blade assembly 40 and to support the axial load thereof, a concentric pair of ball bearing races 33 containing a plurality of ball bearings (not shown) are interposed between the lower end 42L of the hub 42 and the upper surface 30 of the bottom plate 22, centered on the turbine shaft axis A-A, with the ball bearing races attached to said upper surface and the lower end of the hub 42 resting on the ball bearings; FIG. 6.

Figure 5:
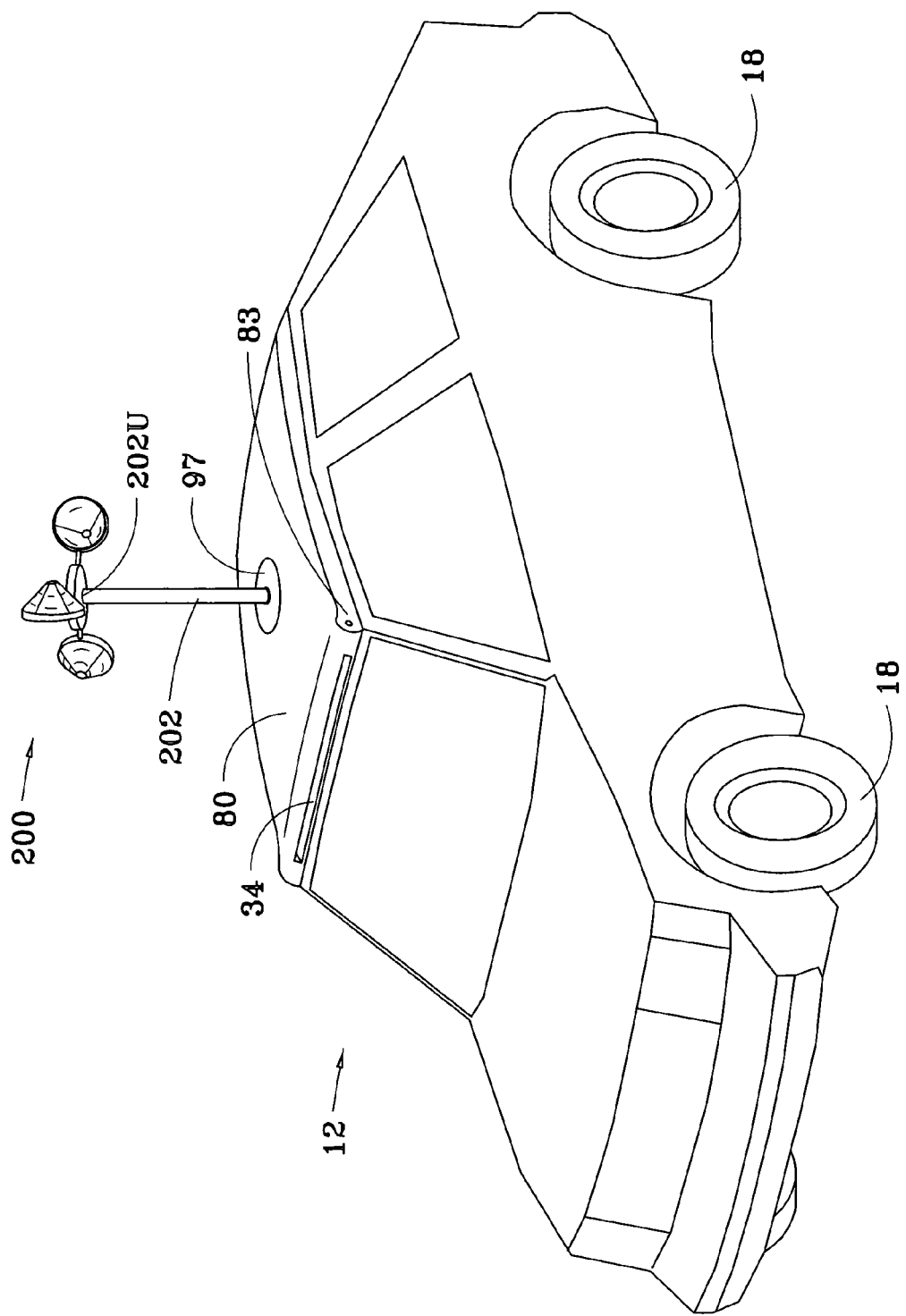
FIG. 5 is a front, perspective view thereof with the external wind turbine of the invention mounted to the vehicle for charging the electric storage battery of the vehicle while the vehicle is parked.
Figure 15:
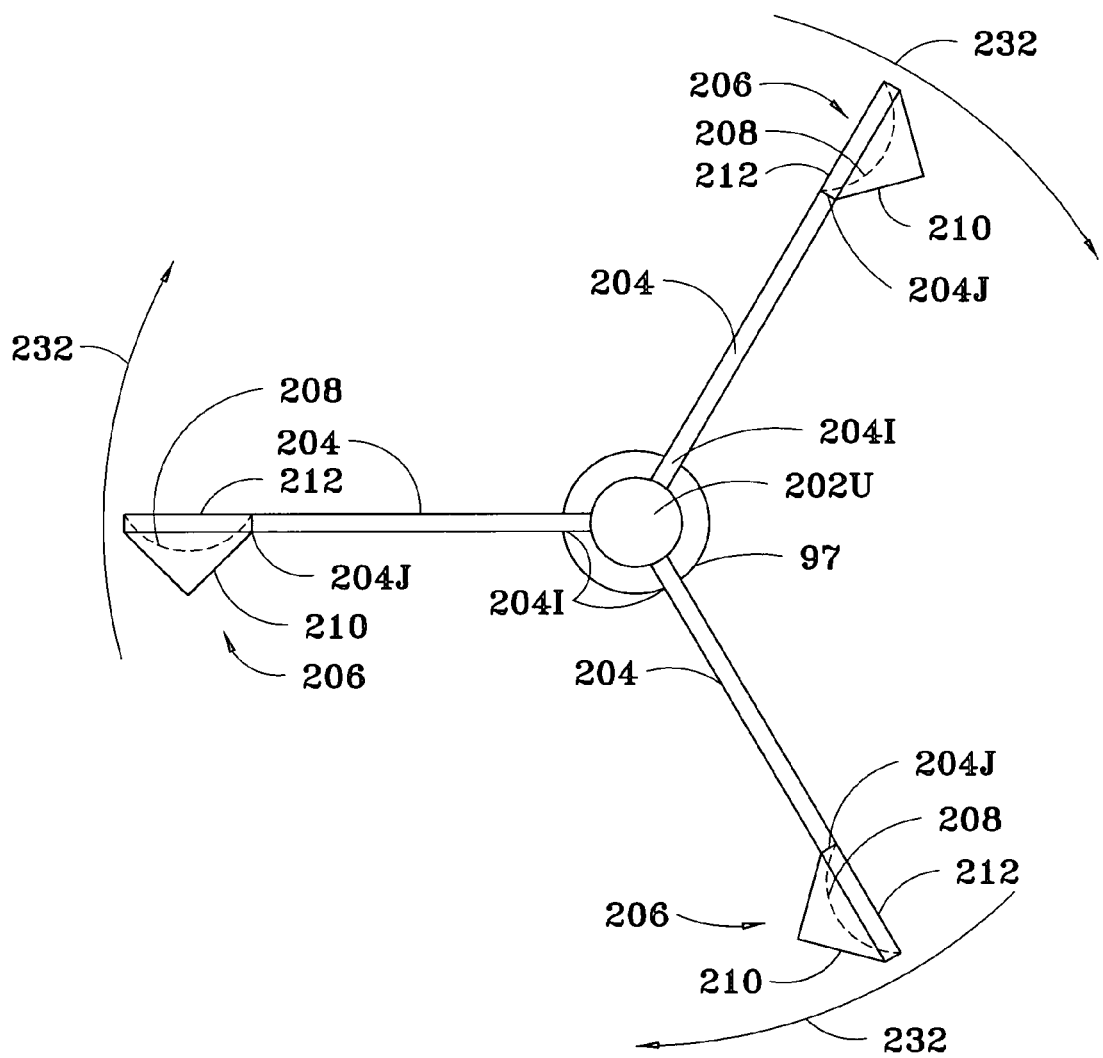
FIG. 15 is an enlarged, top plan view of the external wind turbine (the vehicle roof is omitted in this view).

For converting ambient wind energy into electrical current to charge the electric storage battery of an all-electric vehicle 12 while the vehicle is parked, the invention further includes an external wind turbine 200. The external wind turbine 200 may be stored in the trunk 13 or other secure location within the vehicle 12 until it is needed. As may be seen in FIGS. 5 and 15, the external wind turbine 200 includes an external shaft 202 that extends from an upper end 202U to an opposite, lower end 202L along an external shaft axis, and is rotatable about that axis. The external wind turbine 200 further includes a plurality of radially-directed arms 204 circumferentially spaced apart around the upper end 202U of the external shaft 202. Each arm 204 has an inner end 204I attached to the external shaft 202 and an opposite, outer end 204O. For catching ambient wind currents, a cup 206 is attached to an outer end 204O of each arm 204. Each cup 206 has a concave inner surface 208 (dashed lines in FIG. 15) and a convex outer surface 210 that meet at the opening 212 of the cup. The opening 212 of each cup 206 is directed essentially along the tangent to the rotational path (arrows, 232) of the cups about the external shaft axis, and all the cups are oriented in the same rotational sense about the external shaft axis, as illustrated, for example, in FIG. 15. The number of arms and cups is optional, but three of each spaced at 120° intervals about the external shaft axis is the preferred number. Thus, the external wind turbine 200 resembles a cup anemometer in appearance and mechanical function. Cups 204 are used in the external wind turbine instead of turbine blades as a better way to harness the energy in ambient, variable, low velocity winds while the vehicle 12 is parked.

Figure 11:
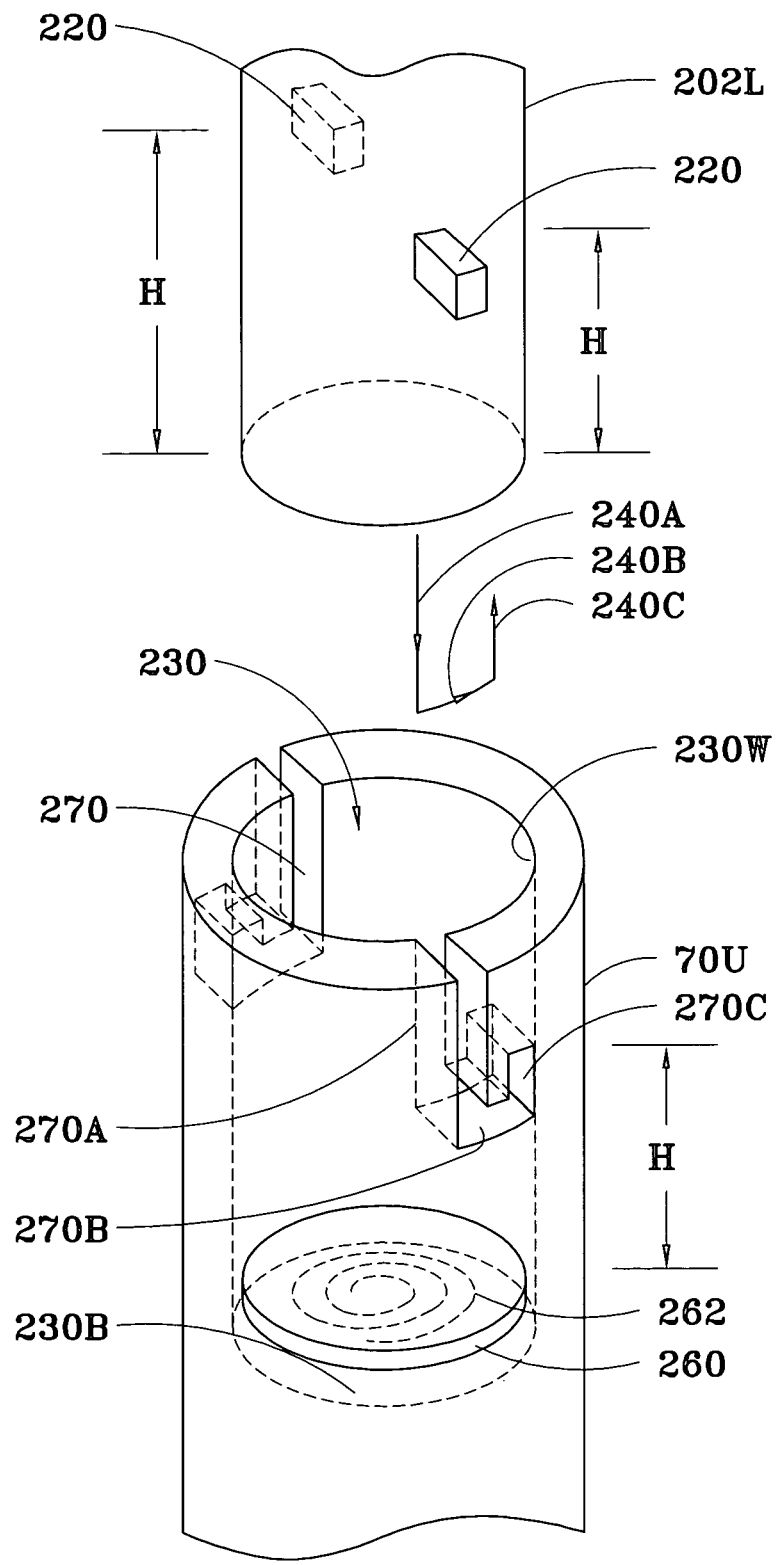
FIG. 11 is an enlarged, perspective, side view of a hub shaft according to a first embodiment of the invention, wherein an upper end portion of the hub shaft has a cylindrical, upper recess dimensioned to receive a lower end portion of the external shaft of an external wind turbine, said shaft has a pair of oppositely-disposed, radially-directed ears that are insertable into an oppositely-disposed pair of grooves in the wall of the upper recess when the external turbine shaft is moved axially downward into the upper recess as indicated by arrow 240A, rotated about the turbine shaft axis A-A as indicated by arrow 240B, and axially retracted as indicated by arrow 240C.
Figure 12:
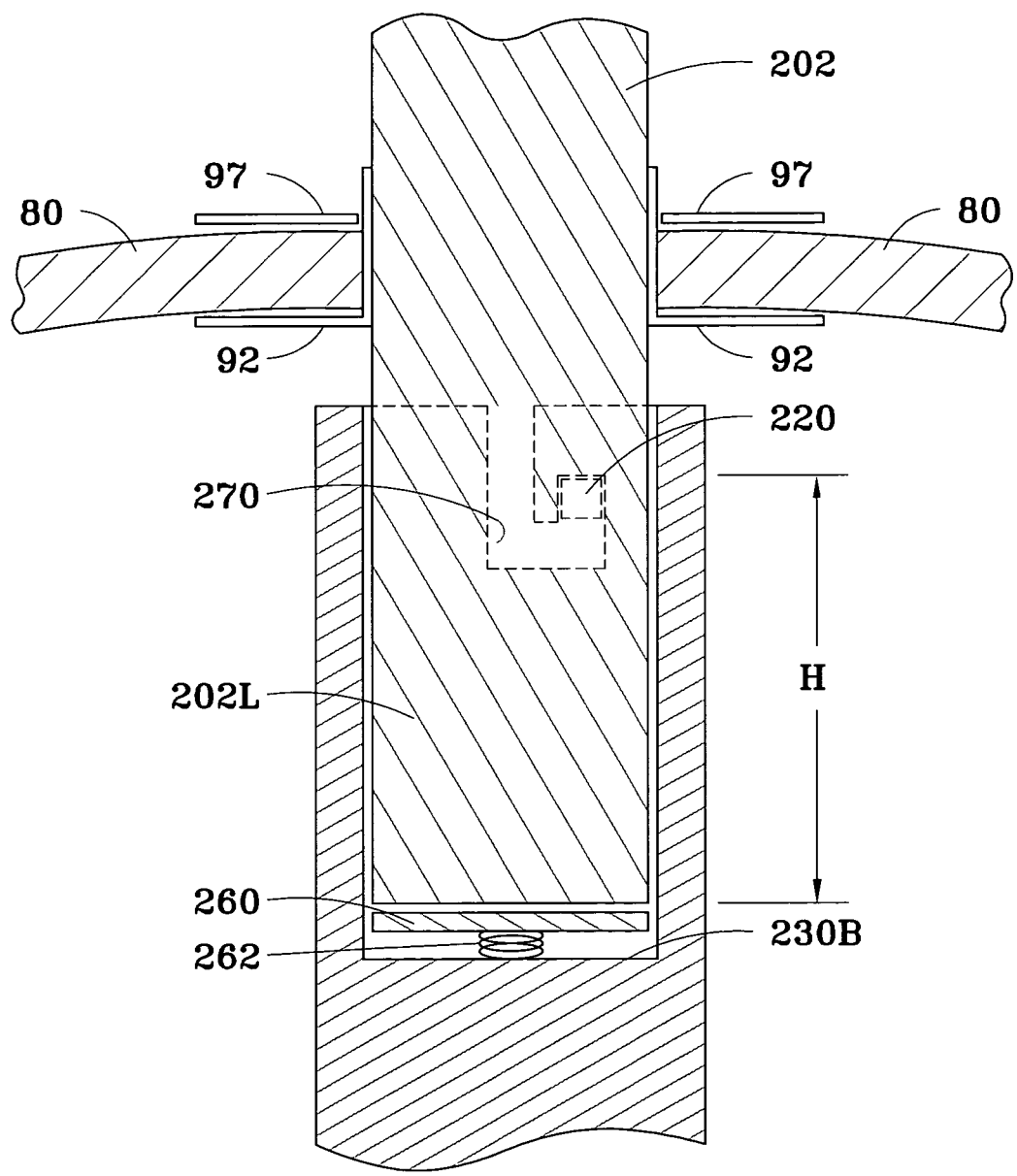
FIG. 12 is an enlarged, vertical, cross-sectional view of the lower end portion of the external turbine shaft of FIG. 11 shown inserted through an opening in the lid and into the upper recess of the hub shaft and with an ear lodged within a blind end of a grooved pathway.

The external wind turbine 200 includes means to couple a lower end portion 202L of the external shaft 202 to the hub 42 while maintaining the external shaft in coaxial alignment with the turbine shaft axis A-A. To that end, an upper end portion 70U of the hub shaft 70 has a cylindrical recess 230 that extends downward along the turbine shaft axis A-A from the upper end of the hub shaft to a bottom end 230B of the recess, thereby defining a recess wall 230W. The recess 230 is shaped and dimensioned to receive in close-fitting, surrounding engagement a cylindrical, lower end portion 202L of the external shaft 202 when said shaft is inserted through the opening 82 of the lid 80. In a first embodiment of the invention, the recess wall 230W has a pair of grooved pathways 270 disposed at diametrically opposite locations on the recess wall. As depicted in FIG. 11, each pathway 270 comprises, sequentially, a first leg 270A that extends from the upper end of the hub shaft 70 toward the bottom end 230B of the recess 230, a second leg 270B that extends through a circumferential arc normal to the turbine shaft axis A-A, and a third leg 270C that extends reversely part way back toward the upper end of the hub shaft 70, thereby forming a blind end of the pathway. Attached to the lower end portion 202L of the external shaft 202 are a pair of oppositely-disposed, oppositely-directed ears 220. The ears 220 are shaped and dimensioned to be received in sliding engagement within the grooved pathways 270 when the lower end portion 202L of the external shaft is inserted into the recess 230. Preferably, the first embodiment means to couple a lower end portion 202L of the external shaft 202 to the hub 42 further includes a disk-shaped, buffer plate 260 disposed near the bottom end 230B of the recess 230. The diameter of the buffer plate 260 is slightly less than the internal diameter of the recess 230 so that the buffer plate can slide axially up and down along the recess wall 230W. Disposed intermediate the buffer plate 260 and the recess bottom 230B is a spring 262 (e.g., a coil spring) that urges the buffer plate axially upwards towards the pathways 270.

To couple the external shaft 202 to the hub shaft 70 according to the first embodiment of the invention, the lower end portion 202L of the external shaft is passed through the opening 202 of lowered lid 80, and the ears 220 are aligned with the first legs 270A of the pathways 270. The shaft 202 is then pressed down against the buffer plate 260 as the ears slide down along the first legs 270A (arrow 240A), thereby compressing the spring 262. The external shaft 202 is then rotated about the turbine shaft axis A-A to slide the ears 220 through the circumferential legs 270B (arrow 240B). Lastly, the external shaft 202 is retracted axially to permit the ears 220 to slide along legs 270C (arrow 240C) and lodge in the blind ends of the pathways 270. The spring 262 helps to keep the ears 220 firmly within the blind ends of the pathways 270. For this to work properly, the distance H between the ears 220 and the lower end of the external shaft 202 needs to be about equal to the distance between the buffer plate 260 and the blind ends of the pathways 270 when the external shaft is coupled to the hub shaft—i.e., when the spring 262 is at least partially decompressed. To uncouple the external shaft 202 from the hub shaft 70, that process is simply reversed.

Figure 13:
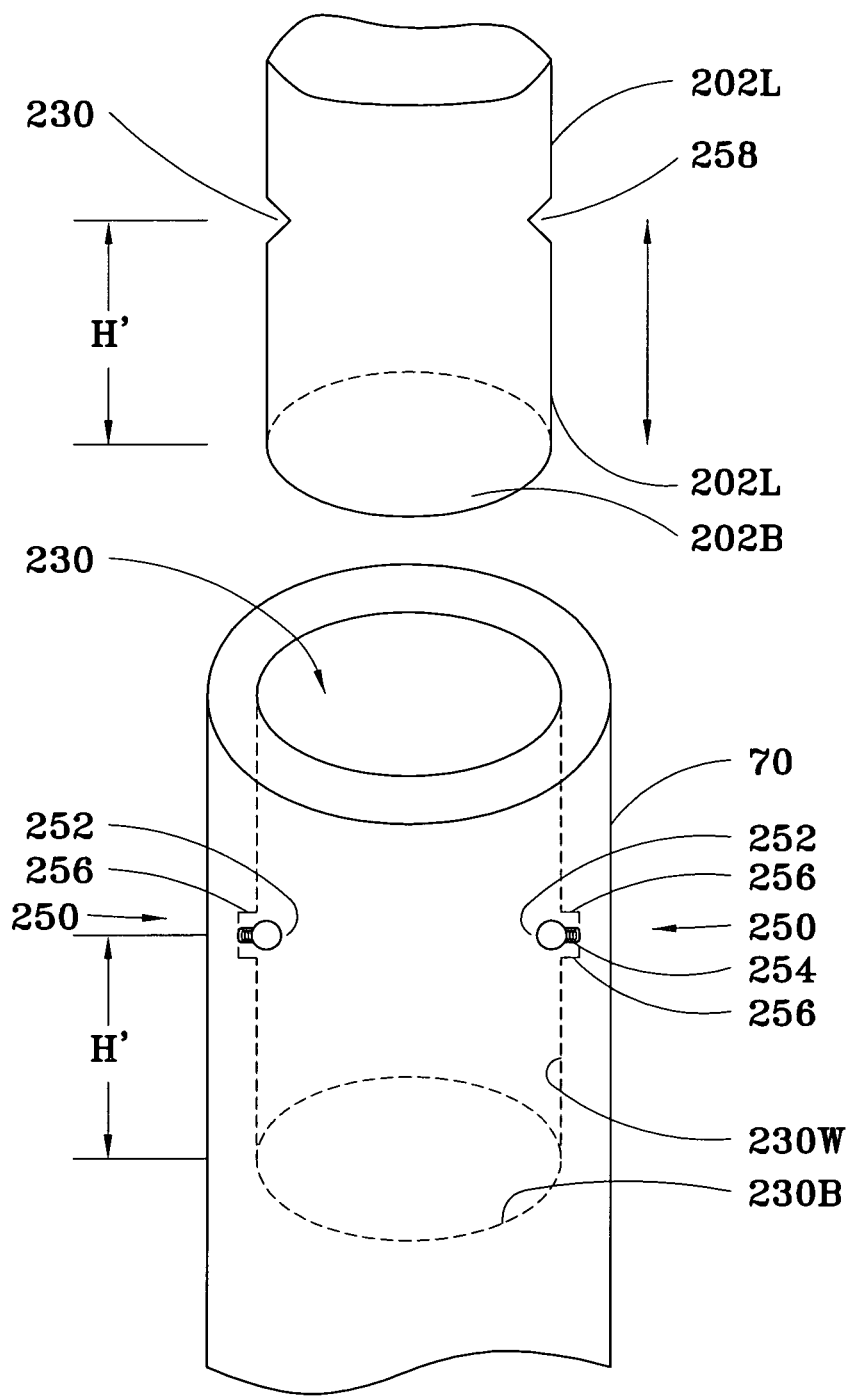
FIG. 13 is an enlarged, perspective, side view of a hub shaft according to a second embodiment of the invention, wherein an upper end portion the hub shaft has a cylindrical, upper recess for receiving a lower end portion of the external shaft of an external wind turbine, which shaft has oppositely-disposed, radially-directed, beveled recesses, an upper end portion of the hub shaft has an upper recess dimensioned to receive the lower end portion of the external shaft, and a pair of oppositely-disposed ball-and-spring assemblies attached to the inner wall of the upper recess.
Figure 14:
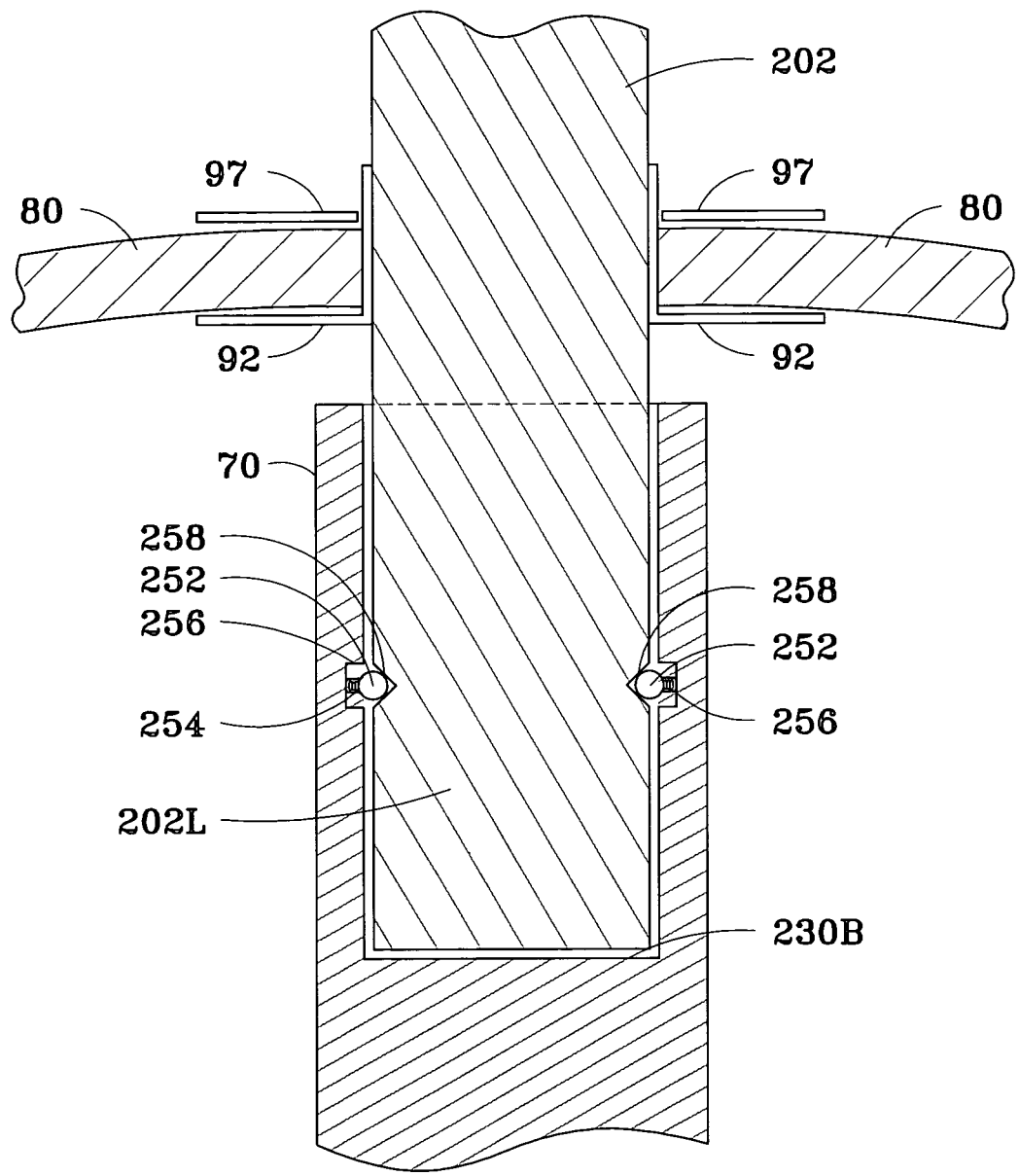
FIG. 14 is an enlarged, cross-section on a vertical plane that includes the ball-and-spring assemblies of FIG. 13, showing the balls thereof inserted into the beveled recesses of the external shaft, thereby coupling the external turbine shaft to the hub shaft for co-rotation therewith.

In a second, alternative embodiment of the invention, the hub shaft 70 likewise has an axially-directed, cylindrical recess 230 that extends from the upper end of the hub shaft to a bottom end 230B of the recess, and the recess is dimensioned to receive in surrounding engagement a lower end portion 202L of the external shaft 202. As depicted in FIGS. 13 and 14, an oppositely-disposed pair of ball-and-spring assemblies, denoted generally by the numeral 250, is attached to the recess wall 230W. Each such assembly 250 comprises a spring 254 having a first end attached to an alcove 256 in the recess wall 230W and an opposite end attached to a ball 252. For each assembly 250, when its spring 254 is uncompressed, its ball 252 extends at least part way out of the alcove 256 and partially occludes the recess 230. A lower end portion 202L of the external shaft 202 has a pair of oppositely-disposed, notched, indents 258. Each indent 258 comprises an upper, inwardly beveled edge surface that is joined to a lower, outwardly beveled edge surface. The distance H' between the bottom 202B of the external shaft 202 and the indents 258 corresponds to the distance H' between the recess bottom 23B and the ball-and-spring assemblies 250. Accordingly, to couple the external shaft 202 to the hub shaft 70, with the vehicle 12 parked and the lid 80 in lowered position, the cap 96 is removed and the lower end portion 202L of the external shaft is passed through the lid opening 82 and into the hub shaft recess 230. Initially, downward movement of the external shaft 202 forces the balls 252 into the alcoves 256 and the springs 254 are compressed; but, upon arrival of the indents 258 at the alcoves 256, the balls, under the urging of the springs 254, move into the indents. Thus, to operate properly, the alcoves 256 need to be large enough to accommodate both the balls 252 and the springs 254. To uncouple the external shaft 202 from the hub shaft 70, the external shaft is grasped and yanked upward, thereby sliding the lower beveled surfaces of the indents 258 past the balls 252, forcing the balls back into the alcoves until the external shaft has been fully raised above them, after which the balls once again extend from the alcoves out into the recess. Although only a single pair of indents 258 and a single pair of ball-and-spring assemblies 250 have been illustrated and described, additional pairs of each for coupling the external shaft 202 to the hub shaft 70 are within the scope and intent of the present invention.

Thus, it should be evident that a system for harnessing wind energy to charge an electric storage battery of an all-electric motor vehicle according to the concepts of the present invention has been shown and described in sufficient detail to enable one of ordinary skill in the art to practice the invention. Although not illustrated and described above, it will be understood that practicing the invention requires routing electrical cables from electrical output terminals of the generator 48 through the vehicle 12 to its electrical storage battery. Since various modifications in detail, materials, arrangements of parts, and equivalents thereof, are within the spirit of the invention herein disclosed and described, the scope of the invention should be limited solely by the scope of the appended patent claims.

What is claimed is:

1. A system for charging an electric storage battery of an all-electric motor vehicle, said system comprising:
   an internal wind turbine that is mountable to the roof of said vehicle, said roof having been provided with a centrally-disposed, vertically-directed, through-hole, said internal wind turbine including
      a housing, said housing including
         a bottom panel, which panel extends longitudinally from a front end to an opposite, rear end thereof, and extends laterally from a first side to an opposite, second side thereof, said bottom panel being dimensioned and contoured to closely overlie an exterior surface of at least the portion of said vehicle roof that includes said through-hole, said panel having a centrally-disposed, flat, upper surface and a vertically-directed, shaft opening in said flat upper surface that extends through said panel to an opposite, lower surface thereof;
         an air inlet opening that overlies said front end of said bottom panel;
         an air outlet opening that overlies said rear end of said bottom panel;
         an air flow corridor attached to said bottom panel that extends between, and joins, said air inlet and outlet openings, said corridor comprising an entryway portion in communication with said air inlet opening, a discharge portion in communication with said air outlet opening, and a central portion that communicates with said entryway and discharge portions, said entryway portion being contoured to conduct air entering said inlet opening toward said second side of said bottom, said central portion being contoured to conduct air rotationally around said shaft opening, and said discharge portion being contoured to conduct air within said central portion to said air outlet opening; and
         a turbine blade assembly disposed within said central portion of said corridor, said assembly including
            a hub that extends axially along the turbine shaft axis from a first, lower end to a second, upper end thereof and is rotatable about said axis;
            a plurality of turbine blades distributed about the periphery of the hub and extending radially away from said hub normal to said axis, wherein each blade has a weighted, blade tip; and
         electric generator means, which means includes
            an electric generator;
            means for attaching said electric generator to an inside surface of the roof of the vehicle; and
            means for coupling the shaft of the electric generator to the hub; and
      a lid, wherein
         said lid extends longitudinally from a front end to an opposite rear end thereof;
         said front end of said lid is pivotally attached to a front portion of said housing such that the lid is pivotable between a lowered, housing-covering position and a raised, open position;
         in said lowered position, said lid, in combination with the corridor and bottom panel, forms a closed compartment surrounding said turbine blade assembly, except for the air inlet and air outlet openings; and
         locking means attachable to a rear end of said lid and to a rear portion of said vehicle for alternately securing the lid in said lowered position and releasing the lid to a raised position.

2. The system of claim 1, wherein the central portion of the air flow corridor includes first and second, upstanding, semi-cylindrical, interior walls that are laterally and symmetrically spaced apart on opposite sides of the turbine shaft axis.

3. The system of claim 2, wherein the housing further includes
   upstanding, first and second pivot mounts attached to first and second sides of the bottom panel, respectively, at or near a front end of said panel, to which pivot mounts said lid is pivotally attachable by one or more hinge pins.

4. The system of claim 3, wherein the air flow corridor further includes a tongue that extends laterally from said first pivot mount part way across, and above, said front end of the bottom panel.

5. The system of claim 2, wherein each blade tip comprises at least 10% of the entire weight of each blade.

6. The system of claim 4, wherein each weighted, blade tip comprises a bead of material attached to a tip end of said blade.

7. The system of claim 6, wherein each blade comprises metal and the weighted, blade tip thereof comprises a metal bead welded to a tip end of said blade.

8. The system of claim 2, wherein
   the means for coupling the shaft of the electric generator to the hub includes an adaptor, which adaptor is attachable to said generator shaft, and includes a plurality of radially-directed, splines circumferentially distributed about said adaptor; and
   a lower portion of said hub has a recess that is shaped and dimensioned to receive in mating engagement said splines.

9. The system of claim 8, wherein
   said adaptor has a throughbore having internal diameter dimensioned to receive in surrounding engagement said generator shaft,
   said adaptor has a plurality of radially-directed, circumferentially spaced-apart, threaded apertures,
   and said adaptor includes a plurality of set screws threadably insertable through said apertures to thereby attach said adaptor to said generator shaft.

10. The system of claim 8, wherein the hub assembly further includes a hub shaft that is attached to, and extends axially, above the upper end of the hub to a hub shaft upper end.

11. The system of claim 10, wherein
the hub has an axial throughbore that extends from the lower end to the upper end of the hub; and
the hub shaft extends through said throughbore to a hub shaft lower end.

12. The system of claim 11, wherein said hub shaft lower end has a recess that is shaped and dimensioned to receive in mating engagement the adaptor splines.

13. The system of claim 12, wherein
the hub shaft has a pin aperture and the hub has a pin aperture, which apertures are alignable with each other when the hub shaft is inserted within the throughbore of the hub; and
the hub assembly further includes a pin that is insertable through both the pin aperture of the hub shaft and the pin aperture of the hub when said apertures are aligned.

14. The system of claim 4, wherein the lid has an opening where the turbine shaft axis passes through the lid when the lid is in a lowered position.

15. The system of claim 14, further comprising to seal the housing against moisture and air leaks.

16. The system of claim 15, wherein the means to seal the housing against moisture and air leaks includes a hub grommet, which grommet has a ring seal portion joined to an upstanding, neck portion that extends up through and above said opening in said lid, a washer mounted on said neck portion adjacent to an upper surface of said lid, and a cap seal that is mountable on said neck portion over said washer.

17. The system of claim 14, further comprising
an external wind turbine, said turbine including
an external shaft that extends from an upper end to an opposite, lower end along an external shaft axis, which shaft is rotatable about said axis;
a plurality of radially-directed arms circumferentially spaced apart around said external shaft, wherein each arm has an inner end attached to said shaft and an opposite, outer end; and
a cup attached to an outer end of each arm, wherein each cup has a concave inner surface and a convex outer surface that meet at the opening of the cup, the opening of each cup is directed essentially along the tangent to the rotational path of the cups about said external shaft axis, and all cups are oriented in same rotational sense about the external shaft axis; and
means to couple the lower end of the external shaft to the hub for co-rotation therewith while maintaining the external shaft in coaxial alignment with the turbine shaft axis.

18. The system of claim 17, wherein the number of arms and cups is three and the arms are circumferentially spaced apart from each other at 120° angles.

19. The system of claim 18, wherein
an upper end portion of the hub shaft has a recess that extends downward along the turbine shaft axis from the upper end of the hub shaft to a bottom end of the recess, which recess is shaped and dimensioned to receive in surrounding engagement a lower end portion of the external shaft, thereby defining a recess wall, said wall having a pair of grooved pathways therein, which pathways are disposed at diametrically opposite locations on the recess wall, and each pathway extends from the upper end of the hub shaft part way toward the bottom end of said recess, thence extends
substantially normal to the turbine shaft axis, and thence extends reversely part way back toward the upper end of the hub shaft, thereby forming a blind end of the pathway;
a pair of oppositely-disposed, oppositely-directed ears are attached to, and extend away from said lower end portion of the external shaft, which ears are shaped and dimensioned to be received in sliding engagement within said grooved pathways; and
the means to couple the lower end of the external shaft to the hub co-rotation therewith, while maintaining the external shaft in coaxial alignment with the turbine shaft axis, includes a pair of oppositely-disposed, oppositely-directed ears attached to, and extending away from, said lower end portion of the external shaft, which ears are shaped and dimensioned to be received in sliding engagement along the grooved pathways.

20. The system of claim 19, wherein the means to couple the lower end of the external shaft to the hub for co-rotation therewith, while maintaining the external shaft in coaxial alignment with the turbine shaft axis, further includes a buffer plate disposed within the recess intermediate the bottom end and the grooved pathways thereof, which buffer plate is shaped and dimensioned for sliding engagement with an inner surface of the recess wall and along the turbine shaft axis (A-A), and a spring disposed intermediate the bottom wall of the recess and the buffer plate for urging the buffer plate away from the bottom end and toward the grooved pathways.

21. The system of claim 17, wherein
an upper end portion of the hub shaft has an upper recess that extends downward along the turbine shaft axis from the upper end of the hub shaft to a bottom end of the recess, which recess is shaped and dimensioned to receive in surrounding engagement a lower end portion of the external shaft, thereby defining a recess wall;
the recess wall has one or more alcoves;
one or more spring-and-ball assemblies are attached to said one or more alcoves, each said assembly comprising a spring having a first end attached to said alcove and a second, opposite end to which is attached a ball, such that the ball is movable between an extended, recess-occluding position and a retracted, non-occluding position within an alcove; and
the lower end portion of the external shaft has at least one beveled indent that is dimensioned to receive in sliding engagement, and capture, a ball when said lower end portion is lowered into the upper recess of the hub shaft, and, when the external shaft is yanked upward, to release and retract the ball back into an alcove.

* * * * *